United States Patent Office 3,422,702
Patented Jan. 21, 1969

3,422,702
INFINITELY VARIABLE SPEED GEAR
TRANSMISSION
Harry E. Novinger, 1 Parkway Drive,
Englewood, Colo. 80110
Continuation-in-part of application Ser. No. 535,639,
Mar. 7, 1966. This application Dec. 28, 1966, Ser.
No. 605,296
U.S. Cl. 74—793                                    5 Claims
Int. Cl. F16h 3/68, 1/16

ABSTRACT OF THE DISCLOSURE

This invention pertains to the use of gear mechanisms interacting to steplessly vary the speed of an output shaft relative to the speed of an input shaft. An internal helical gear circumscribes and drives a chain of idler helical gears. This chain of gears circumscribes an output gear at increasingly varying angles for driving the output gear at infinitely variable speeds. The output gear is able to be supported and to mesh with the chain of idlers by being constructed with a conical surface comprised of curved teeth of uniform size throughout their lengths and of progressively varying radius of curvature equidistantly spaced between consecutive teeth.

---

This application is a continuation-in-part of application Ser. No. 535,639 filed Mar. 7, 1966.

The need for a simple, steplessly variable speed gear changing device has been desired in transportation and industry. All prior known variable speed devices are attended by serious drawbacks such as slippage, stepped ratio changes, losses in heat, large size, high cost of manufacture, and general inefficient use of power input.

Therefore, it is the essential object of this invention to avoid these drawbacks, and provide a gear speed changing mechanism that will permit the more effective and efficient use of internal combustion engines and gas turbine engines when operated in varying load and power configurations and particularly at full throttle, torque, speed or combination thereof.

Another object of the present invention is to further develop operative embodiments inherent with the earlier application for patent that are based upon a novel application of progressively varying radius of curvature gear teeth and helical gear assemblies interacting with a manned or automatically governed positioning of one mechanism relative to the other so as to provide means for gradually varying the geared ratio of turn between input and output.

Further objects, details, and advantages may be seen from the following description and accompanying drawings representing exemplary but non-exclusive forms or embodiments of the invention, wherein.

Figure 3:
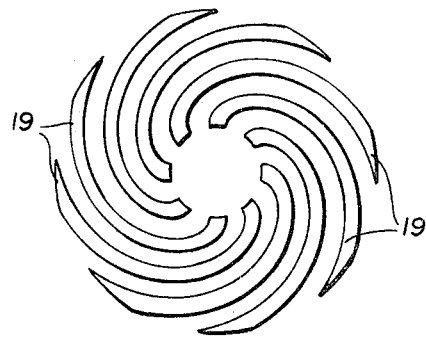

FIG. 3 is a perpendicular diagrammatic view of the novel progressively varying radius of curvature gear in one plane surface illustration to clearly show uniform size of teeth, equi-distant spacing between consecutive teeth throughout their lengths, extremities of teeth of a practical embodiment, the increasingly steeper angles of the teeth relative to their axes of rotation, and the teeth lying between circles of different diameter.

Like parts are designed by like characters throughout the specification and drawings of the present invention.

Part 1 may be of helical design, one of a train of idler gears independently carried or mounted through their respective axes 1A for rotation upon transverse web-like portions 18. Portions 18 and co-located idlers 1, of any design plurality, extended radially throughout the perimeter of web-like portions 18A. The train of idlers 1 have a diameter designed to circumscribe and mesh or engage with gear 2 at various plane of rotation angles. 18 and 18A may be considered as an idler carrier. The axles 1A may be off-set, in respect to consecutive axles in the chain of idlers, as necessary to align the teeth of gears 1 to the teeth of 3 due to the unusual cut of the helix of 3 and the different plane of rotation of each of idlers 1. The term "plane of rotation" means a plane perpendicular to the axis of rotation of the object being cited.

Gear 2 is a novel shaped curved tooth gear which may be the driven gear in this embodiment. It is fixed to shafts 7 which are rotatable to case 13. The unusual curved design of the teeth of 2, which may be individually constructed for lamination and secured by bolting, welding or other binding together methods, are shaped with a gradual change of radius of curvature throughout their lengths that result in a varying angle of the teeth to their axes of rotation and to their plane of rotation.

Engaged with and circumscribing the chain of idlers 1 is internal helical gear 3. 3 is comprised of web-like portions 3C fixed upon both sides of teeth 3A of gear 3. Teeth 3A may be of laminated construction similar to 2 for economical manufacture. As gears 3 and 1 act together as a unit in developing infinitely variable ratios from gear 2, they may be grouped by functions as an assembly or a gear; and in this embodiment, a driving assembly or driving gear. 3 may be directly driven by the driving source of power, or as shown through gear 4 being in mesh with teeth 3B which circumscribe and are fixed to 3.

Gear 4 is driven through universals 10, splined shafts 8 by driving shaft 9. 4 is rotatably mounted in carrier 6. 6 bears or supports gear 3 and carrier 18A through bearings 17 which permit inter-rotatability of 18A and 3 in respect to 6.

6 may move through its arc a–b by rotating at journal axes 5 or other means to establish an arcuate or arc movement, depending on design and dimensions of both gear 2 and idler train 1. In this regard, the amount of diameter difference of the surface of gear 2 directly affects the radius of curvature of the teeth of 2. Axes 5, being located off the center of 6 provides a simple means for anchoring and aligning 6 to gear 2. Movement of 6 through arc a–b may be accomplished by manual or automatic control of hydraulic booster 12 through arm 11 movably connected to 6 at 14.

FIG. 3 diagrammatically shows a one plane view of the 360° pattern or net of teeth, designated as 19, as similarly constructed for the surface of gear 2. Teeth 19 may be considered a gear which will be seen as having all the characteristics listed earlier for FIG. 3. It may also be seen that another gear of constant tooth spacing may track and operate at any engagement circle on its surface about its axes of rotation with increasingly varying angles of rotation in respect to each other as their relative longitudinal positions of engagement change. This angular change between the two gears, which will later be fully explained as resulting in infinite changes of speed, may be re-stated as a progressively varying angle of engagement.

Housing 13 may be of any design fitted for oil retaining, compactness and strength. It is perforated as necessary to receive the shafts.

Operationally, this invention utilizes a law of nature that permits the construction of a gear having a surface of curved teeth of uniform size disposed between circles of different diameter and each one curved with a varying radius of curvature while maintaining equi-distant spacing between consecutive teeth throughout their lengths. When this gear is in mesh with or engaged by another specially constructed gear to interact with it at varying angles of rotation, infinitely variable output ratios of turn can be obtained in respect to the input of the mechanism for benefits of control and economy of operation whenever such speed regulating or governing devices are required. FIG. 3 shows the tooth shape in one plane. The teeth of one plane may also be extended into a surface in another parallel plane by projecting the teeth 19 to both sides of the parent disk of FIG. 3. Likewise, the associate gear required to interact with this curved gear may be duplicated for each plane to increase the horsepower capacity.

Certain three-dimensional shapes may have portions of their inner or outer surfaces comprised of this novel net of gear teeth by dropping teeth 19 on such shapes as has been done to obtain gear 2. Such shapes, in the same way as for FIG. 3, must have surfaces of different diameter or different radii about their axes of rotation. They included but are not limited to portions of bells, cones, spheroids and hyperboloids. The angle of tooth curve will vary considerably on each different surface but all its characteristics may be retained when the pattern of teeth is properly constructed. If the teeth form the total gear surface of a practical gear of this type, then it may be stated that the total geometrical surfaces of the above shapes are not required nor can be used because their extremities may extend to a point or to infinity. Therefore, this novel gear may best be said to have a surface lying between circles of different diameter.

To utilize this novel gear, one embodiment is to engage helical gears 1 at an angle to gear 2 whereby their respective teeth align for best performance. When so engaged, the angle of engagement of 1 and 2 will vary proportionally with the location of engagement on the surface of 2 due to the design change of curve of the teeth of 2. When both gears are engaged at position $a$, idlers 1 balance the torque of gear 3 and gear 2. Thus 2 is carried with the turn of 3 as a unit and at the least difference in ratio of turn of their respective shafts. As desired, 6 may infinitely change position and hold the point of contact between 1 and 2 within the arc $a-b$. When 6 is selected to maintain a position between $a$ and $b$, a rotation of idlers 1 result because the idlers must rotate about their axes for the chain of idlers to hold that position on gear 2. While changing positions, idlers 1 rotate as an idler train around the axis of 2 with increasingly varying plane of rotation angles in respect to the plane of rotation of 2. This respective angular relationship may also be stated as; a progressively varying angle of engagement between the plane of rotation of idler train 1 and a tangent of one of the circles between which the surface of gear 2 lies.

When a certain ratio of turn has been selected through the positioning of 6, that track upon 2 may be maintained by 6. Except in position $a$, each idler 1 is forced to rotate on its axis and rotate upon the surface of 2; the amount depending upon the extent of the rotation angle of engagement of their respective surfaces and the helical tooth cut of the gears 1 and 3. When walking, the teeth of gears 1 being engaged with the teeth of 3, permit 3 to rotate about the axes of idler train 1 faster than idler train 1 is rotating about the axis of 2. The relative ratio of turn between the driving and driven shafts may thusly be said to be made infinitely or steplessly variable by the infinite or stepless change in the respective location of engagement of gear 1 and 2.

Figure 1:
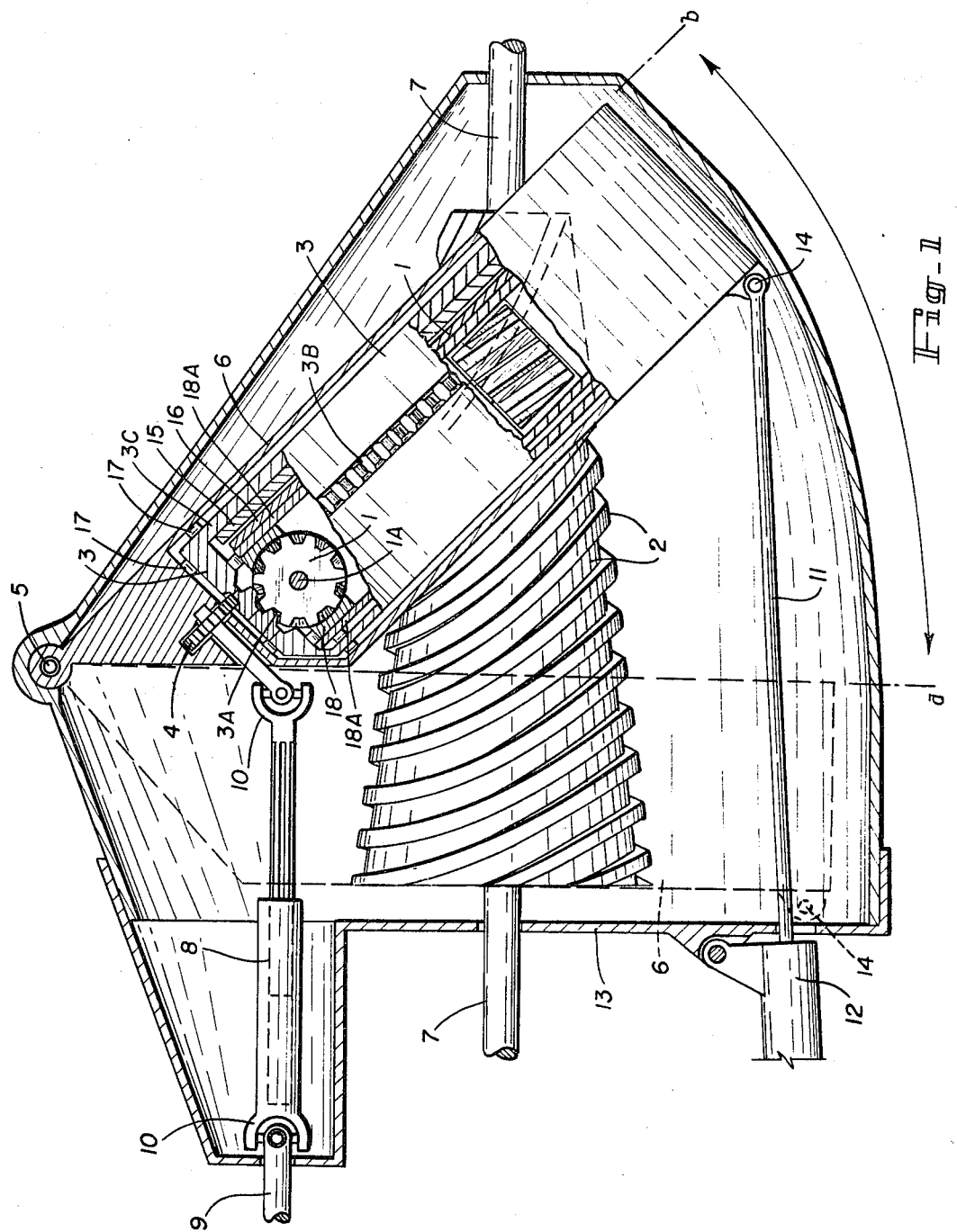
FIG. 1 is a longitudinal view partly in section with case broken away.
Figure 2:
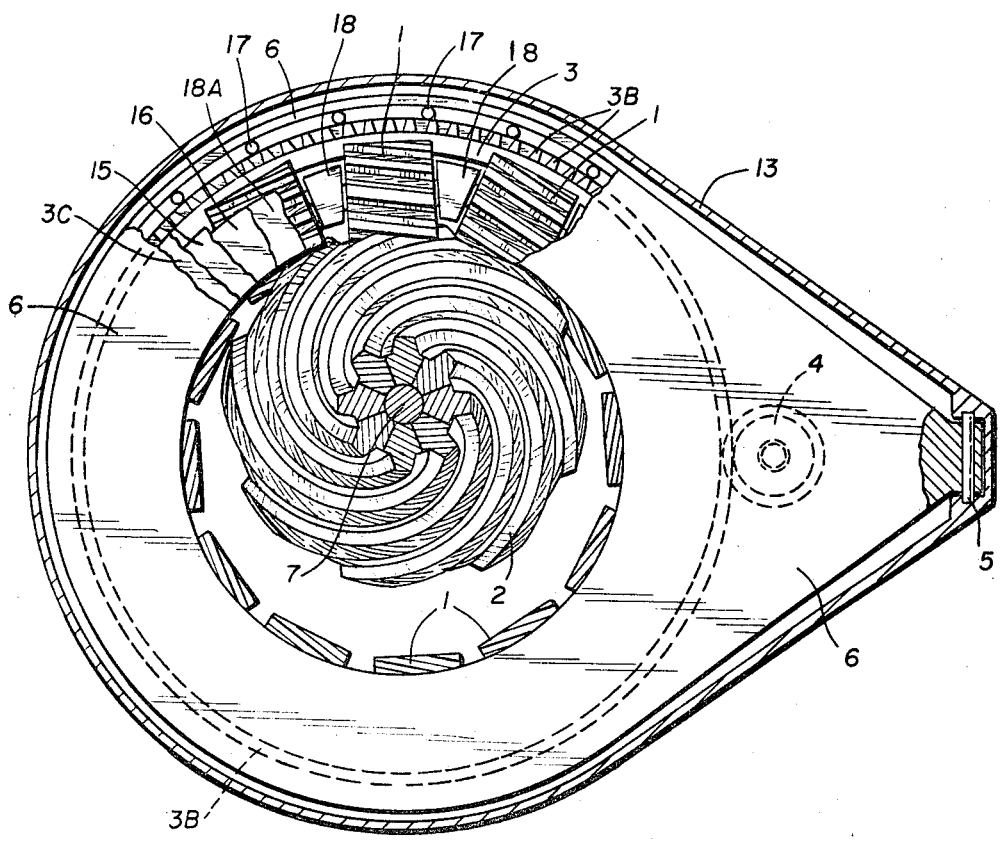
FIG. 2 is a transverse view with driving and driven gears engaged in position a, rather than in b as shown in FIG. 1, for clarity. It is partly in section with case broken away.

Depending on the use of this invention, driving shaft 9 may act as a brake to driven shaft 7, as when an automobile coasts against its engine. For this operation, carrier 6 must approximate position $a$ in FIG. 1 because the helix of internal gear 3 is non-reversible and idlers 1 will lock with 3 whenever idlers 1 are driven by 2. Gears 3, 1 and 2 will rotate together as a unit in this locked state. To eliminate unwanted friction in $b$ position, immediate adjust of 6 into $a$ position is required. Carrier 6 may be manually adjusted exteriorly through arm 11 and hydraulic booster 12 to position $a$ while gears 1, 2 and 3 remain in motion. The exterior adjustment control is also adopted to full open throttle operation on engines. The throttle both governs 6 and also fully opens the carburetor early in the first part of its travel, allowing the remaining part of its travel to direct control of 6.

Bearings, washers, oil seals and inlets have been omitted in most illustrations for simplicity. Their omission does not means their use is impossible.

The design ratio spread between the input and output shafts may range from the extreme of the output shaft being in a non-rotating status when 6 is in position $b$ and 7 is under a torque load to a ratio wherein the output shaft turns with the driving gear 3 and in the same direction.

Although a single embodiment of the invention has herein been illustrated and described, it is to be understood that the invention is not limited thereto. As various changes in the construction or the arrangement may be made without departing from the spirit of the invention, as will be apparent to those skilled in the art, references will be had to the appended claims for a definition of the limits of the invention.

I now claim:

1. A gear with a surface lying between circles of different diameter and comprised of curved teeth of uniform size throughout their lengths and of progressively varying radius of curvature equi-distantly spaced between consecutive teeth.

2. In an infinitely variable speed gear transmission, a gear with a surface disposed between circles of different diameter, said surface comprised of curved teeth of progresively varying radius of curvature equi-distantly spaced between consecutive teeth and means for movably supporting and engaging said gear and another gear so as to establish portions of said gears in mesh and at progressively varying angles of engagement for establishing infinitely variable speed ratios.

3. The invention as defined in claim 2, and wherein said curved teeth being of uniform size, equi-distantly spaced between consecutive teeth throughout their lengths and individually constructed for lamination with means for securing to each other, said other gear comprised of a plurality of gears.

4. In an infinitely variable speed gear transmission, a driving shaft, a driving gear, a driven shaft, a driven gear, means for connecting each shaft to each respective gear, one of said gears having its surface lying between circles of different diameter, said surface comprised of curved teeth of uniform size equi-distantly spaced between consecutive teeth throughout their lengths, the other of said gears being constructed of a plurality of helical gears, one of said helical gears engaged with all the other said helical gears arranged in a circular train of idler helical gears, means for carrying all said helical gears, means for movably supporting and controlling said driving and driven gears so as to establish portions of them in mesh and at increasingly varying angles of engagement with respect to the plane of rotation of said train of gears and a tangent to one of said circles between which the surface of said gear with curved teeth lies for steplessly varying the ratio of turn between their respective shafts.

5. In an infinitely variable speed gear transmission, a driving shaft, means for connecting an internal helical gear thereto, said internal helical gear circumscribing and in mesh with a train of helical idler gears mounted upon and for rotation with respect to an idler carrier, the planes of rotation of said idler gears differing from the plane of rotation of said carrier, a driven gear, means for connecting a driven shaft to said driven gear, said driven gear having a surface lying between circles of different diameter, said surface comprised of curved teeth of uniform size, of progressively varying radius of curvature and equidistantly spaced between consecutive teeth throughout their lengths, means for movably supporting and controlling the positioning of said train of helical idler gears and said driven gear so as to establish portions of said gears in mesh and at progressively varying angles with respect to their planes of rotation for infinitely varying the ratio of turn between said shafts.

References Cited

UNITED STATES PATENTS

| | | | |
|---|---|---|---|
| 464,896 | 12/1891 | Riddell | 74—448 |
| 1,160,216 | 11/1915 | Urie | 74—425.5 |
| 1,437,009 | 11/1922 | Perkins et al. | 74—425 X |
| 1,515,955 | 11/1924 | Knill | 74—348 |
| 1,694,028 | 12/1928 | Wildhaber | 74—458 X |
| 1,753,784 | 4/1930 | Herzog | 74—793 |
| 1,761,962 | 6/1930 | Babitch | 74—458 |
| 2,697,365 | 12/1954 | Williams | 74—348 |

FOREIGN PATENTS

| | | |
|---|---|---|
| 175,430 | 7/1953 | Austria. |
| 544,612 | 6/1956 | Italy. |

DONLEY J. STOCKING, *Primary Examiner.*

T. C. PERRY, *Assistant Examiner.*

U.S. Cl. X.R.

74—417, 424.5, 425.5, 448, 458